United States Patent [19]

Lew et al.

[11] Patent Number: 4,560,986

[45] Date of Patent: Dec. 24, 1985

[54] COMPARATIVE VARIABLE RESISTANCE POSITION INDICATOR

[76] Inventors: Hyok S. Lew, 7890 Oak St., Arvada, Colo. 80005; Michael Stranahan, P.O. Box 15, Woody Creek, Colo. 81656

[21] Appl. No.: 571,343

[22] Filed: Jan. 16, 1984

[51] Int. Cl.$^4$ .................. G08B 5/32; G01F 23/10
[52] U.S. Cl. .................. 340/870.38; 73/313; 73/DIG. 5
[58] Field of Search .................. 73/290 R, 313, 308; 340/686; 324/63, 62 R

[56] References Cited

U.S. PATENT DOCUMENTS

| | | | |
|---|---|---|---|
| 3,443,221 | 5/1969 | McGill | 324/63 |
| 3,673,561 | 6/1972 | Bronstein | 340/686 X |
| 3,975,723 | 8/1976 | Bowling et al. | 340/686 |
| 4,127,843 | 11/1978 | Anzai et al. | 340/870.38 X |
| 4,220,047 | 9/1980 | Manboussin | 73/313 |
| 4,472,969 | 9/1984 | Templin | 73/313 |
| 4,513,617 | 4/1985 | Hayes | 340/870.38 |

Primary Examiner—Daniel M. Yasich

[57] ABSTRACT

This invention relates to a position indicator wherein the information on the location of a position-sensing target is obtained by measuring and comparing the ohmic resistances of two electric circuits including an arrangement comprising a pair of parallel conducting wires of high ohmic resistance and a sliding contact conductor slidable along the two parallel conducting wires while maintaining an electrically conductive contact to both conducting wires. The relative position of the position-sensing target kinematically linked to the sliding contact conductor intermediate two extremities of the pair of parallel conducting wires is obtained by measuring and comparing the ohmic resistance of the two circuits respectively including the sliding contact conductor and each of two halves of the two parallel conducting wires divided by the sliding contact conductor. The relative position obtained in the afore-mentioned method is independent of the ohmic resistance associated with the sliding contact between the conducting wires and the sliding contact conductor.

4 Claims, 4 Drawing Figures

COMPARATIVE VARIABLE RESISTANCE POSITION INDICATOR

BACKGROUND OF THE INVENTION

In todays' industry, there is a large demand for devices that sense the position of a remotedly located target and displays the information or feeds the information to industrial control systems. It requires quite a simple technology and an inexpensive product package to provide such a position-sensing and the indicating device when the error allowable in the automatic position sensing technology is comparable to one quarter or to one eighth of an inch while it requires a challenging and expensive technology to provide a position sensing device with a high accuracy tolerating an error of a few thousandth of an inch. The former type devices may be applied to the level sensors used for automatically detecting the fluid level in reservoirs and tanks and to the various control devices used in material handling devices, while the latter types are used in automated machine and forming tools. Most of the present day level sensors providing a continuous reading on the fluid level in the reservoirs and tanks are either expensive or lack simplicity and reliability.

The primary object of the present invention is to provide a position-sensing device that utilizes the principle of variable resistance against electric current.

Another object of the present invention is to provide a position-sensing device that utilizes two counterbalancing variable resistance circuits wherein the output is independent of the contact resistance between the circuit wires and the sliding contact conductor.

A further object of the present invention is to provide a totally enclosed position-sensing device wherein the functional components are totally isolated from the surrounding fluids.

Yet another object of the present invention is to provide a position-sensing device of explosion-proof grade.

Yet a further object of the present invention is to provide a position-sensing device that is highly reliable and inexpensive.

These and other objects of the present invention will become clear as the description thereof proceeds.

SPECIFICATION

The present invention may be described with great clarity and specificity by referring to the following Figures.

Figure 1:
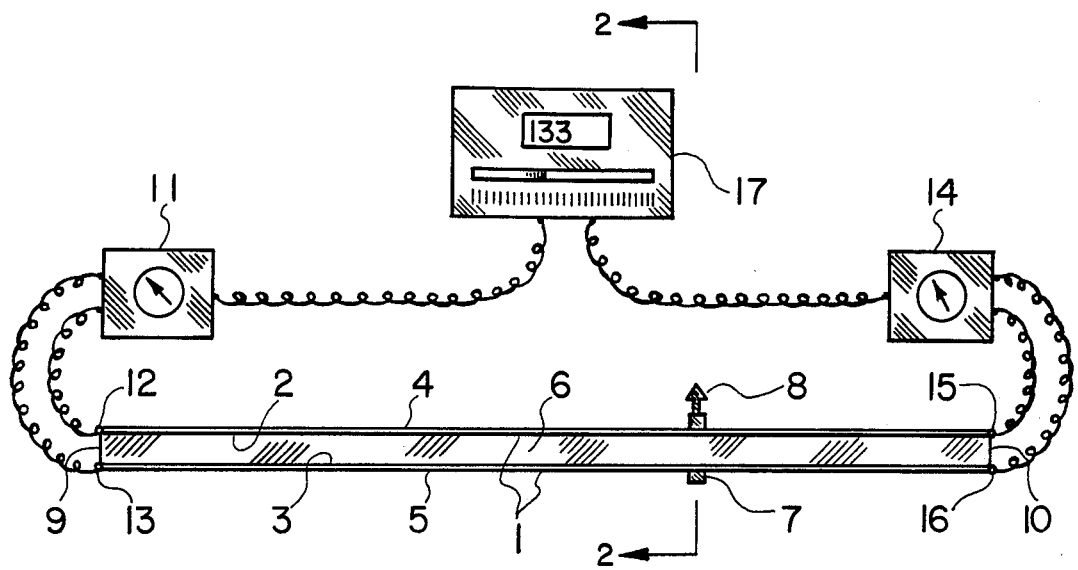
FIG. 1 illustrates a general arrangement of the functional parts describing the working principles of the present invention.
Figure 4:
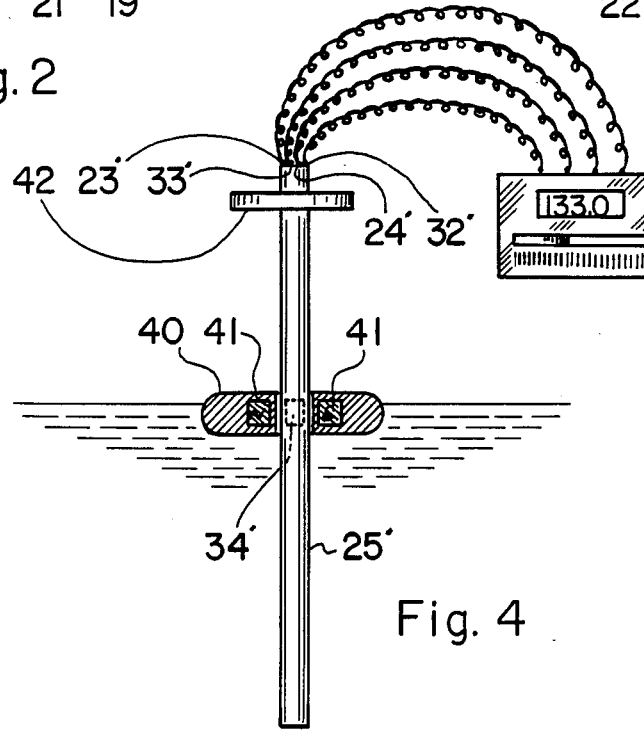
FIG. 4 illustrates a perspective view of a level sensor employing a comparative ohmic resistance circuitry constructed in accordance with the principles of the present invention, a cross section of which comparative ohmic resistance circuitry is shown in FIG. 3.

In FIG. 1, there is shown a general arrangement of the functional parts employed in a position-sensing device operating per principles of the present invention. The principal element is the comparative ohmic resistance circuitry 1 comprising two parallel electrically conducting cords or wires 2 and 3 with a high specific ohmic resistance anchored along two edges 4 and 5 of an elongated member or bar 6 made of a dielectric material. The sliding contact conductor 7 including a marker 8 is slidably attached to the dielectric elongated member 6 and provides an electric connection between the two cords 2 and 3 wherein the sliding contact conductor 7 is slidable in the direction parallel to the length of the comparative ohmic resistance circuitry 1 while maintaining the electric connection between two cords 2 and 3. An embodiment providing the electric connection between the two cords 2 and 3 by the sliding contact conductor 7 is further illustrated in FIG. 2 and described in conjunction therewith. It is readily recognized that the comparative ohmic resistance circuitry 1 includes two ohmic resistance circuits, e.g. the first circuit comprising the portions of the cords 2 and 3 intermediate one extremity 9 and the sliding contact conductor 7 plus the sliding contact conductor 7; and the second circuit comprising the portions of the cords 2 and 3 intermediate the other extremity 10 and the sliding contact conductor 7 plus the sliding contact conductor 7. The first power input-measuring device 11 measures the difference in the electromotive force between the ends 12 and 13 of the cords 2 and 3 at one extremity 9 of the comparative ohmic resistance circuitry 1, and measures the electric current flow from the power input-measuring device 11 to the cord 2 which is the electric current flow in the first circuit included in the comparative ohmic resistance circuitry 1. The second power input-measuring device 14 measures the difference in the electro motive force between the ends 15 and 16 of the cords 2 and 3 at the other extremity 10 of the comparative ohmic resistance circuitry 1, and measures the electric current flow from the power input-measuring device 14 to the cord 2 which is the electric current flow in the second circuit included in the comparative ohmic resistance circuitry 1. The position display or output device 17 performs a comparative analysis on the voltages and currents detected by and transmitted from the power input-measuring devices 11 and 14, and displays the absolute or relative position of the sliding contact conductor 7 intermediate two extremities 9 and 10 of the comparative ohmic resistance circuitry 1 or provides an output signal representing the absolute or relative position of the sliding contact conductor 7. In actual packaging of the present invention the three devices 11,14 and 17 may be integrated into one single block box as shown in FIG. 4.

Figure 2:
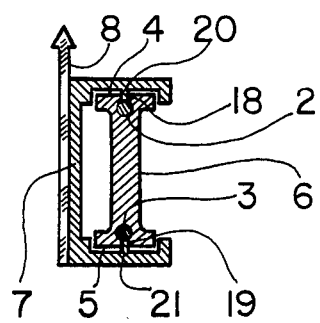
FIG. 2 illustrates a cross section of the comparative ohmic resistance circuitry constructed in accordance with the principles of the present invention, which cross section is taken along a plane 2—2 as shown in FIG. 1.

In FIG. 2, there is shown a cross section of the comparative ohmic resistance circuitry 1 taken along a plane 2—2 perpendicular to the length of the comparative ohmic resistance circuitry 1 as shown in FIG. 1. The dielectric elongated member or bar 6 may have a cross section of an I-beam to provide a good flexural rigidity. The ohmic resistance wires 2 and 3 are retained at the roots of the grooves 18 and 19 with a narrowed-down opening disposed lengthwise on two edges 4 and 5 of the dielectric bar 6. The sliding contact conductor 7 including a position marker 8 has a pair of contact points 20 and 21 maintaining an electrically conducting contact with the ohmic resistance cords 2 and 3 at all instances, which sliding contact conductor 7 is slidably attached to the dielectric bar 6.

The position-sensing device described in conjunction with the general arrangement shown in FIGS. 1 and 2 may be operated in a number of different modes. One mode of operation is the alternating measuring method wherein one circuit included in the comparative ohmic resistance circuitry is switched open when the other circuit included in the comparative ohmic resistance circuitry is being measured. It is not difficult to find out that the relative position S of the sliding contact conductor 7 measured from one extremity 9 of the comparative ohmic resistance circuitry 1 and presented in decimal can be calculated from the following equation:

$$S = \frac{(e_1/i_1) - (e_2/i_2) + 2r}{4r},$$

where e and i designates the aforementioned voltage and electric current, the subscript 1 and 2 stand for the first circuit adjacent to the extremity 9 and the second circuit adjacent to the extremity 10 of the comparative ohmic resistance circuitry 1, respectively; and r designates the linear specific resistance of the ohmic resistance cords 2 and 3. The power input-measuring devices 11 and 14 detects ($e_1$, $i_1$) and ($e_2$, $i_2$), respectively, while the display-output device 17 executes the computation defined by the aforementioned equation and displays or outputs the result of the computation.

The other mode of operation of the position-sensing device illustrated in FIGS. 1 and 2 is the simultaneous measuring method wherein both circuits included in the comparative ohmic resistance circuitry are simultaneously and continuously measured by the power input-measuring devices 11 and 14. Under the simultaneous measuring method, the relative position of the sliding contact conductor 7 can be computed from the equation $$S = \frac{e_1 - e_2 + 2r \cdot i_2}{2r(i_1 + i_2)},$$

where the designation of the symbols are the same as those used in conjunction with the alternating measuring method. In the mode of operation employing the simultaneous measuring, it is preferred to use the power sources of two different values so that $e_1$ is not equal to $e_2$. It should be understood that it is not necessary to use a high ohmic resistance wire for both of the cords 2 and 3, as only one of two cords 2 and 3 can be of a high ohmic resistance wire. It should be further understood that the cross section of the dielectric bar 6 and that of the sliding contact conductor 7 may be designed quite differently from those shown in FIG. 2. The sufficient and necessary condition for the design of the cross section of the comparative ohmic resistance circuitry is the smooth sliding relationship and the sound electrically conducting contact between the cords and the sliding contact conductor included in the comparative ohmic resistance circuitry. It is very important to understand that in both modes of operation, the output information on the position of the sliding contact conductor is not influenced by the degree or quality of the electrical conducting contact between the points 20 and 21, and the pair of the ohmic resistance wires 2 and 3, which contact can change in time due to contamination or due to mechanical wear on the surfaces under sliding contact. This feature is the principal principle of the present invention which is the end result of the comparative ohmic resistance circuitry including two separate electrical circuits commonly depending on the same sliding contact conductor.

It should be understood that the principles of the electric circuitry described in conjunction with FIG. 1 that enables to construct a position sensing device as shown by an illustrative embodiment illustrated in FIG. 1 may be applied to construct many different position sensing devices having many different applications such as a remote mechanical position sensing devices, fluid level sensing devices, etc. The principal object of the present invention is to provide a position sensing device including the sliding contact conductor that can be kinematically linked to a marker means by mechanical, magnetic, pneumatic or hydraulic means. Consequently, the present invention is not limited by any specific kinematic linkage means between the sliding contact conductor and a marker means.

Figure 3:
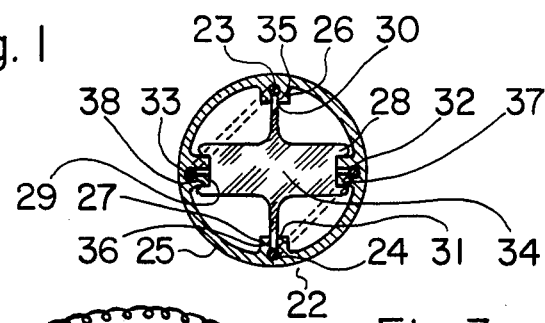
FIG. 3 illustrates a cross section of another comparative ohmic resistance circuitry totally enclosed within a protective tubular shield.

In FIG. 3, there is shown a cross section of another comparative ohmic resistance circuitry packaging 22 taken along a plane perpendicular to the length of the comparative ohmic resistance circuitry packaging 22. A pair of the electrically conducting wires 23 and 24 are disposed parallel to one another in a dielectric and diamagnetic tubing 25 with four ribs 26, 27, 28 and 29 disposed lengthwise on the inside surface of the tube wall in an axisymmetric pattern. A pair of high ohmic resistance wires 23 and 24 are secured at the root of a pair of grooves 30 and 31 with a narrowed-down opening disposed along the ridge of the ribs 26 and 27. A pair of the high conductivity wires 32 and 33 are secured at the root of a pair of grooves with a narrowed-down opening disposed along the ridge of the ribs 28 and 29. The high ohmic resistance wire 23 is connected to the high conductivity wire 33 at the far extremity or the other extremity of the comparative ohmic resistance circuitry packaging 22 enclosed within a dielectric and diamagnetic tubing 25 with its far end or the other end sealed off; whereby the comparative ohmic resistance is completely enclosed within the protective shield of the tubing 25. The high ohmic resistance wire 24 is connected to the high conductivity wire 32 at the far extremity or the other extremity of the comparative ohmic resistance circuitry packaging 22. The sliding contact conductor 34 made of an electrically conducting and ferromagnetic material includes a pair of contact points 34 and 35 in contact with the high ohmic resistance wires 23 and 24 and a pair of guide grooves 37 and 38 slidably engaged by the ribs 28 and 29. It should be understood that there is no electrically conducting contact between the high conductivity wires 32 and 33 and the sliding contact conductor 34. The near end or one end of the shielding tubing 25 is permanently or removably sealed off while the pair of high ohmic resistance wires 23 and 24 and the pair of high conductivity wires 32 and 33 extend through the sealed off one end of the shield tubing 25 in a leak-proof manner and are provided with connector terminals. In other words, the comparative ohmic resistance circuitry 22 is completely enclosed within the sealed-off shield tubing 25.

In FIG. 4, there is shown a perspective view of a fluid level sensor employing a comparative ohmic resistance circuitry hermetically packaged in a shield tubing such as that shown in FIG. 3. The ends of the pair of high ohmic resistance wires 23' and 24' extending through the capped end of the shield tubing at one extremity are connected to the first power input-measuring device, while the ends of the pair of high conductivity wires 32' and 33' extending through the capped end of the shield tubing at one extremity are connected to the second power input-measuring device, wherein said two power input-measuring devices are integrally packaged with a data analyzing and output device into a single data processing package 39. The level sensing of the fluid level is done by a float 40 equipped with a permanent magnet 41 arranged in an annular geometry that slides on the shield tubing 25' wherein the movement of the float 40 moves the sliding contact conductor 34' slidably disposed within the shield tubing 25'. A mounting flange 42 may be disposed at one extremity of the shield tube to provide means for mounting the comparative ohmic resistance circuitry package 22 onto a reservoir or a tank cap.

While the principles of the present invention have now been made clear by the illustrative embodiments, there will be immediately obvious to the skilled in the art many modifications of the structure, elements, proportions, arrangement and materials particularly adapted to specific working environments and operating conditions in the practice of the invention without departing from those principles of the present invention.

We claim:

1. A position-sensing device comprising in combination:
    (a) a pair of electrically conducting cords disposed parallel to one another in a dielectric support wherein at least one of said pair of electrically conducting cords has a high specific ohmic resistance;
    (b) a sliding contact conductor slidable along said pair of electrically conducting cords intermediate two extremities of said pair of electrically conducting cords wherein said sliding contact conductor provides a localized electrical connection between said pair of electrically conducting cords by maintaining an electrically conducting contact with both of said pair of electrically conducting cords;
    (c) a first measurement device electrically connected to said pair of electrically conducting cords at substantially one extremity of said pair of electrically conducting cords, said first measurement device including means for measuring electric current flow in and a voltage drop of the electromotive force over a first electric circuit comprising a first portion of said pair of electrically conducting cords intermediate said sliding contact conductor and said one extremity of said pair of electrically conducting cords and said sliding contact conductor;
    (d) a second measurement device electrically connected to said pair of electrically conducting cords at substantially the other extremity of said pair of electrically conducting cords opposite to said one extremity, said second measurement device including means for measuring electric current flow in and a voltage drop of the electromotive force over a second electric circuit comprising a second portion of said pair of electrically conducting cords intermediate said sliding contact conductor and said the other extremity of said pair of electrically conducting cords and said sliding contact conductor;
    (e) an output device including means for converting information on said electric currents in and drops of said electromotive forces over said first and second electric circuits to information on a relative position of said sliding contact conductor intermediate said one and the other extremities of said pair of electrically conducting cords; and
    (f) means for coupling the sliding movement of said sliding contact conductor and a movement of a position marker indicating a position to one another wherein movement of said marker creates sliding movement of said sliding contact conductor;

whereby, said information on the relative position of said sliding contact conductor relates to information on the relative positions of said marker.

2. The combination as set forth in claim 1 wherein said combination includes means for displaying information on positions of said sliding contact conductor.

3. The combination as set forth in claim 1 wherein said combination includes means for transmitting information on positions of said sliding contact conductor.

4. The combination as set forth in claim 1 wherein said pair of electrically conducting cords are insulated from said sliding contact conductor and said pair of electrically conducting cords are in contact with said sliding contact conductor.

* * * * *